3,840,487
AQUEOUS EMULSION PAINT EMPLOYING NOVEL LOW MOLECULAR WEIGHT ACRYLIC POLYMER DISPERSING AGENTS TO ACHIEVE HIGHER GLOSS
Allen F. Dyson, Bradford, and David Marshall, Mirfield, England, assignors to Allied Colloids Manufacturing Company Limited, Bradford, Yorkshire, England
No Drawing. Filed May 10, 1972, Ser. No. 251,996
Claims priority, application Great Britain, June 3, 1971, 18,861/71
Int. Cl. C08f 15/36, 47/16
U.S. Cl. 260—29.6 H      7 Claims

ABSTRACT OF THE DISCLOSURE

A water soluble dispersing agent which is a copolymer of unsaturated monocarboxylic acid moieties with unsaturated monocarboxylic acid ester moieties is used as a dispersing agent for dispersions of solid particulate material, which is preferably a pigment. The dispersion is most preferably an emulsion paint comprising an organic binder, a pigment and the dispersing agent.

---

It is comon practice to include in aqueous dispersions of particulate material a dispersing agent. This serves to facilitate the preparation of the dispersion and to promote the maintenance of the dispersion. Thus it is common practice to include dispersing agents in emulsion paints, where it is particularly important to produce and maintian a high degree of pigment deflocculation since the fineness of the pigment not only contributes to the opacity but also to the covering power and smoothness of the coating obtained from the paint.

The dispersing agent should be one that, even at quite low concentrations (for example less than 1%) assists in the formation of dispersions of suitably low viscosity. The dispersing agent should also be one that assists in the formation of dispersions having desirable rheological properties. Also the dispersing agent is required to promote long term stability of the paint, this often being called "can stability."

It is common practice to prepare an emulsion paint first by slurrying the pigments in water together with other water miscible components, for example cellulose derivations, preseravtives and antifoam agents and the desired dispersing agent. The resultant slurry is then compounded with the other ingredients of the paint, including the binder. The dispersing agent chosen must not only deflocculate the pigment in this slurry, prior to mixing with the binder and other ingredients of the paint, but should also faclitate the production of a low viscosity, high solids content slurry which is easy to handle. The dispersing agent is commonly used in an amount of from 0.1 to 1% based on the weight of pigment.

Dispersing agents often used in the preparation of emulsion paints and other aqueous dispersions of particulate solids include alkali metal salts of polyphosphates, polyacrylates, lignosulphonates, sulphonated naphthalene formaldehyde condensates and styrene maleic acid copolymer resins.

A disadvantage of the known dispersing agents is that if they are used in amounts which are sufficient to give good deflocculation and long term can stabilize their presence; tends to detract from the properties desired of the resultant film, such as opacity when the dispersion is a flat emulsion paint, and opacity and gloss when the dispersion is a gloss emulsion paint. It has been our object to form improved dispersions, and especially to form dispersions which when used as emulsion paints are of improved opacity and, if the paint is a gloss paint, of improved gloss.

According to the invention a stable anionic dispersion of solid particulate material in an aqueous medium contains a water soluble dispersing agent which is an alkali metal or ammonium salt of a copolymer of moieties of an unsaturated monocarboxylic acid of the formula:

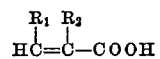

with moieties of an unsaturated carboxylic acid ester of the formula:

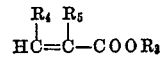

In these formulae $R_1$, $R_2$ $R_4$ and $R_5$ may be the same or different and are hydrogen or methyl while $R_3$ is an alkyl group containing from 1 to 8 carbon atoms. $R_3$ pereferably contains 1 to 5 carbon atoms.

Suitable unsaturated monocarboxylic acids for use as the acid moiety include acrylic acid, methacrylic acid and crotonic acid. Suitable esters that may be used as the ester moiety include methyl acrylate, ethyl acrylate, propyl acrylate, butyl acrylate, methyl methacrylate, and ethyl crotonate.

If the molecular weight of the compound is too high it will not be a dispersing agent but will instead tend to flocculate the solids. Accordingly the molecular weight must be sufficiently low that the copolymer serves as a dispersing agent and preferably the average molecular weight is below 75,000. Most preferably it is below 30,000.

The copolymers preferably contain from 40 to 95 mole percent of the unsaturated monocarboxylic acid and 5 to 60 mole percent being of the ester moieties. More preferably the copolymers contain from 75 to 90 mole percent of the acid moieties and 10 to 25% of the ester moieties. Preferred copolymers are ones containing acrylic acid and an acrylate but any combination of acid and ester may be used, for example acrylic acid and a methacrylate, methacrylic acid and an acrylate, crotonic acid and an acrylate, or acrylic acid and a crotonate. In the ester $R_3$ may be any suitable alkyl group, either branch chain or straight chain. Preferred values of $R_3$ are methyl, ethyl, N-propyl and N-butyl but others, for example isopentyl and isobutyl, may be used.

Mixtures of unsaturated acids having the formula specified, or mixtures of unsaturated esters having the formula specified, or mixtures of both acids and esters may be used. For example a copolymer suitable for use in the invention may be formed from a mixture of acrylic acid and methacrylic acid as the acid moieties and a mixture of acrylates or with, for example, an acrylate and a methacrylate as the ester moieties.

The copolymers may contain solely the specified acid and ester moieties but may contain additional moieties derived from neither an unsaturated monocarboxylic acid nor an ester of such an acid. Such additional components in the polymer do not usually offer any particular advantages and so are usually avoided. However, if they are included they will generally be present only in small amounts, e.g. less than 25%, and preferably the amounts of acid and ester are within the ranges given above.

The copolymer is present as an alkali metal or ammonium salt and so substantially all the acid groups of the copolymer should be neutralised to convert them to salt form, and this can conveniently be achieved by adding alkail to the acid copolymer until it is substantially neutral, i.e. having a pH of about 7. Any water soluble base of an alkali metal or ammonia may be used. The preferred material is sodium hydroxide, the preferred salts being sodium salts. Other satisfactory salts include the ammonium salts and potassium salts.

Although the copolymers can be prepared by various methods, e.g. partial hydrolysis of a polyester or partial esterification of a polyacid, they are generally formed simply by polymerising the desired starting monomers together in the desired proportions. Thus the copolymers may be made by conventional free radical polymerisation procedures. In order to control their molecular weight to the desired low values indicated above various conventional methods may be used. For example the molecular weight may be controlled by adjustment of the temperature which, in turn, controls the generation of free radicals. In another method the molecular weight is controlled by choosing apropriately the amount of initiator added to the reaction mixture. In another method the molecular weight is controlled by adding an appropriate amount of a suitable chain transfer agent to the reaction mixture.

The defined dispersing agents may be used as the sole dispersing agent in a dispersion or they may be used in combination with one or more different but compatible dispersing agents, for example polyphosphates, polyacrylates or styrene maleic anhydride resin solutions. Usually they are used as the sole dispersing agent.

Although the dispersing agents of the invention are of value in any aqueous dispersion they are of particular value in the formation of emulsion paints and thus may be compounded with inorganic or organic particulate pigments. Preferably the pigments are inorganic. Thus dispersions may be formed of, for example, titanium dioxide, china clay or calcium carbonate. The amount of dispersing agent is normally from 0.01 to 1% based on the weight of pigment. Generally a concentrated slurry of the dispersed solids, the dispersing agent and a small amount of water is first formed, for example by ball milling, and the slurry then compounded with other paint forming ingredients to form a matt or gloss emulsion paint. The slurry may contain, for example, 50% or more pigment.

In another method, especially for the production of some gloss water paint systems, a pigment dispersion is first made of pigment in a non-aqueous slurry with an organic solvent, such as ethylene, propylene or hexylene glycol in which the copolymer is dissolved and water and the other ingredients of the paint are then added. Many of the dispersing agents used previously cannot be used satisfactorily in this method due to inadequate solubility in the solvent.

Some examples of the invention are now given. Preparations 1 and 2 illustrate the preparation of dispersing agents suitable for use in the invention while Examples 1 to 3 show dispersions with known dispersing agents and also dispersions according to the invention formed with the dispersing agents made in Preparations 1 and 2, and the properties of the various dispersions are compared.

PREPARATION 1

60 parts by weight methyl acrylate are mixed with 40 parts by weight acrylic acid and added over a period of 2 hrs. to refluxing isopropanol containing 0.6% azo catalyst on weight of monomers. The copolymer was neutralised with sodium hydroxide to pH 7 and the isopropanol removed by distillation and replaced by addition of water. The resultant copolymer was a copolymer of 56 mole percent methyl acrylate and 44 mole percent acrylic acid. The neutralised copolymer had a viscosity of 500 centipoise Brookfield measured at 20 r.p.m. at 40% concentration in water at 20° C., this indicating an average molecular weight of the order of 5,000. The product was termed "copolymer 1."

PREPARATION 2

The process of Preparation 1 was repeated except that in place of 60 parts by weight methyl acrylate there was used 30 parts by weight butyl acrylate and the amount of acrylic acid was 75 parts by weight. The resultant copolymer, after neutralisation, had an average molecular weight of the order of 2,000. It consisted of 19 mole percent butyl acrylate and 81 mole percent acrylic acid, as the sodium salt. It was labelled copolymer 2.

EXAMPLE 1

A number of pigment slurries, using different dispersing agents, were made by dispersing rutile titanium dioxide in sufficient water containing dispersing agent to form a slurry containing 80% by weight titanium dioxide. Various amounts of the different dispersing agents were used and the minimum viscosity obtainable with each dispersing agent, and the optimum dosage of dispersing agent to obtain this, were recorded. The values are given in Table I.

TABLE I

| Dispersing agent | Optimum dosage for minimum viscosity, percent dispersion on pigment | Brookfield viscosity in cps. at 20 r.p.m. and 20° C. |
| --- | --- | --- |
| Sodium polyacrylate | 0.15 | 480 |
| Polyphosphate | 0.15 | 500 |
| Styrene maleic resin | 1.00 | 210 |
| Copolymer: | | |
| 1 | 0.15 | 550 |
| 2 | 0.20 | 350 |

In this test a viscosity below 700 cps. would be regarded as acceptable.

As seen from Table I the products of this invention yield suitable low viscosity slurries when used in quantities similar to those of the conventional dispersants.

EXAMPLE 2

A number of latex/pigment blends were prepared from different dispersing agents as follows:

30 p.b.w. of a 50% wt./wt. slurry of rutile titanium dioxide containing 1% dry weight dispersing agent based on the dry weight of the pigment was mixed with 50 p.b.w. of a 50% wt./wt. vinyl acetate/olefin copolymer latex and a trace of antifoam was also incorporated. The final pH of each mix was between 6.0–6.3.

Each blend was drawn down at 24 micron wet film thickness on a No. 102 Sheen Hiding Power Chart and air dried. After drying the film was assessed for gloss using an EEL 45° gloss head and for opacity using an EEL reflectometer with grey filter. The results are given in Table II.

TABLE II

| Dispersant type | 45° gloss reading | Opacity reading | Gloss reading plus opacity reading |
| --- | --- | --- | --- |
| Sodium polyacrylate | 35 | 56 | 91 |
| Polyphosphate | 35 | 58 | 93 |
| Styrene maleic resin | 23 | 54 | 77 |
| Copolymer: | | | |
| 1 | 39 | 60 | 99 |
| 2 | 44 | 61 | 105 |

In this test a high gloss reading and high opacity figure is the desired result and it is commonly accepted that an increase in either gloss or opacity figures to the extent of "2" is a useful gain. The combined figures in the fourth column indicate the advantages of the copolymers of the invention in this respect.

EXAMPLE 3

This Example illustrates the formation of complete emulsion paints containing dispersing agents according to the invention and other dispersing agents.

40 gms. rutile titanium dioxide, 2 mls. of 20% wt./vol. dispersant solution, 12 gms. of a 5% wt./wt. solution of hydroxyethyl cellulose (Natrosol LR 250), 8 gms. of propylene glycol and 13.4 mls. of water were blended together in a high speed cavitation disperser. After ten minutes 121 gms. of a vinyl acetate/olefin copolymer latex (Epok V 8300) together with 4 gms. of butyl Carbitol acetate as coalescing solvent were added with slow stirring. Antifoam and preservative were added as required. The opacity and gloss measurements of the resulting paints are shown in Table III.

TABLE III

| Dispersant type | 45° gloss reading | Opacity reading | Gloss reading plus opacity reading |
|---|---|---|---|
| Sodium polyacrylate | 52.1 | 73.5 | 125.6 |
| Polyphosphate | 43.5 | 69.4 | 112.9 |
| Styrene maleic resin | 53.8 | 72.0 | 125.8 |
| Copolymer: | | | |
| 1 | 58.5 | 74.2 | 132.7 |
| 2 | 60.2 | 74.5 | 134.5 |

Again the combined figures in the fourth column indicate the advantages obtained by using the copolymers of the invention.

The stability of these paints on storage at 40° C. over a two month period was assessed by measuring gloss and opacity at various time intervals. Table IV indicates changes in the gloss and opacity of the paints after two months storage at 40° C.

TABLE IV

| Dispersant type | Initial readings | | Initial sum gloss plus opacity | After 2 months storage at 40° C. | | After 2 months gloss plus opacity |
|---|---|---|---|---|---|---|
| | 45° gloss | Opacity | | 45° gloss | Opacity | |
| Sodium polyacrylate | 52.1 | 73.5 | 125.6 | 47.0 | 7.30 | 120.0 |
| Polyphosphate | 43.5 | 69.4 | 112.9 | 39.8 | 69.0 | 108.8 |
| Styrene maleic resin | 53.8 | 72.0 | 125.8 | 46.0 | 70.8 | 116.8 |
| Copolymer: | | | | | | |
| 1 | 48.5 | 74.2 | 132.7 | 56.0 | 73.0 | 129.0 |
| 2 | 60.2 | 74.5 | 134.5 | 57.0 | 74.0 | 131.0 |

Again the combined gloss and opacity values indicated in columns 4 and 7 of this Table show the advantages of the copolymers of the invention.

As indicated earlier one of the properties required from the dispersant is that it should preserve certain desirable rheological properties in this paint. Such a property is the brushability and a measure of this is obtained by determining the viscosity of the paint under conditions of high shear.

The viscosities of the paints were determined on a cone and plate viscometer at a shear rate of 10,000 sec.$^{-1}$ and at 20° C. The determinations were carried out on the paints as initially made up and again after 2 months storage at 40° C. The results are shown in Table V.

TABLE V

| Dispersant type | Initial viscosity at 10,000 sec.$^{-1}$, cps. | After 2 months at 40° C., viscosity at 10,000 sec.$^{-1}$, cps. |
|---|---|---|
| Sodium polyacrylate | 30 | 65 |
| Polyphosphate | 30 | 268 |
| Styrene maleic resin | 30 | 120 |
| Copolymer: | | |
| 1 | 30 | 94 |
| 2 | 30 | 88 |

Viscosity readings in this test below 100 cps. are considered generally to give indications of satisfactory applicability of these paints and thus the copolymers of the invention give quite satisfactory results in this respect.

We claim:

1. An aqueous emulsion gloss paint which comprises a blend of a binder latex and a pigment dispersion containing, as dispersing agent, from 0.01 to 1%, based on the weight of pigment, of a polymer having an average molecular weight below 5,000 and which is an ammonium or alkali metal salt of a copolymer containing from 40 to 95 mole percent of moieties of an unsaturated monocarboxylic acid of the formula:

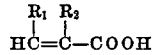

and from 5 to 60 mole percent of moieties of an unsaturated carboxylic acid ester of the formula:

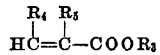

in which $R_1$, $R_2$, $R_4$ and $R_5$ may be the same or different and are hydrogen or a methyl group and $R_3$ is an alkyl group containing from 1 to 8 carbon atoms.

2. A paint according to claim 1 in which the copolymer contains from 75 to 90 mole percent of the acid moieties and 10 to 25 mole percent of the ester moieties.

3. A paint according to claim 1 in which the acid is acrylic acid and the ester is an acrylate ester.

4. A paint according to claim 1 in which the acid is acrylic acid and the ester is methyl acrylate.

5. A paint according to claim 1 in which the binder latex is a vinyl acetate/olefin copolymer.

6. A paint according to claim 1 which has a gloss value as measured by an EEL 45° gloss head of at least 39.

7. A paint according to claim 1 in which the copolymer has been made by copolymerizing the acid and the ester and then neutralizing the acid groups of the copolymer.

References Cited

UNITED STATES PATENTS

| 2,244,703 | 4/1938 | Hubbuch | 260—29.6 |
| 2,945,013 | 7/1960 | Ott | 260—29.6 |

FOREIGN PATENTS

| 985,276 | 3/1965 | Great Britain | 260—29.6 |
| 655,884 | 1/1963 | Canada | 260—29.6 |

WILLIAM H. SHORT, Primary Examiner

P. F. KULKOSKY, Assistant Examiner

U.S. Cl. X.R.

260—296 H